United States Patent [19]
Kisovec

[11] 3,880,551
[45] Apr. 29, 1975

[54] ROTARY HEAD ASSEMBLY FOR ROTARY WING AIRCRAFT
[75] Inventor: Adrian V. Kisovec, Wallingford, Pa.
[73] Assignee: The Boeing Company, Seattle, Wash.
[22] Filed: Nov. 15, 1973
[21] Appl. No.: 415,872

[52] U.S. Cl................ 416/134; 416/138; 416/141; 416/226; 416/241
[51] Int. Cl............................................ B64c 27/52
[58] Field of Search .......... 416/134, 135, 141, 138, 416/230, 241 A, 229, 226, 102, 148

[56] References Cited
UNITED STATES PATENTS

| | | | |
|---|---|---|---|
| 3,193,019 | 7/1965 | Drees et al........................... | 416/140 |
| 3,384,185 | 5/1968 | Fernandez........................... | 416/141 UX |
| 3,484,174 | 12/1969 | McCoubrey...................... | 416/226 X |
| 3,669,566 | 6/1972 | Bourquardez et al............. | 416/134 |
| 3,804,552 | 4/1974 | Covington........................... | 416/134 |
| 3,807,896 | 4/1974 | Johnson.............................. | 416/102 |

FOREIGN PATENTS OR APPLICATIONS

| | | | |
|---|---|---|---|
| 247,395 | 5/1912 | Germany............................. | 416/135 |
| 1,189,136 | 4/1970 | United Kingdom................. | 416/141 |
| 642,206 | 7/1962 | Italy..................................... | 416/138 |

Primary Examiner—Everette A. Powell, Jr.
Attorney, Agent, or Firm—Joseph M. Corr; Robert S. Lipton; Frederic W. Neitzke

[57] ABSTRACT

A rotor head assembly, particularly adapted for use as a helicopter tail rotor head assembly, characterized in that opposing blades are interconnected by an integral, flexible strap mounted on a hub by means of blade mounting means having a degree of torsional flexibility about an axis extending transverse to the longitudinal axes of the blades. This permits the strap and mounting means to twist about the aforesaid transverse axis in response to flapping movements of the blades and eliminates the need for bearings or "shoes" on the hub for supporting the blades.

13 Claims, 9 Drawing Figures

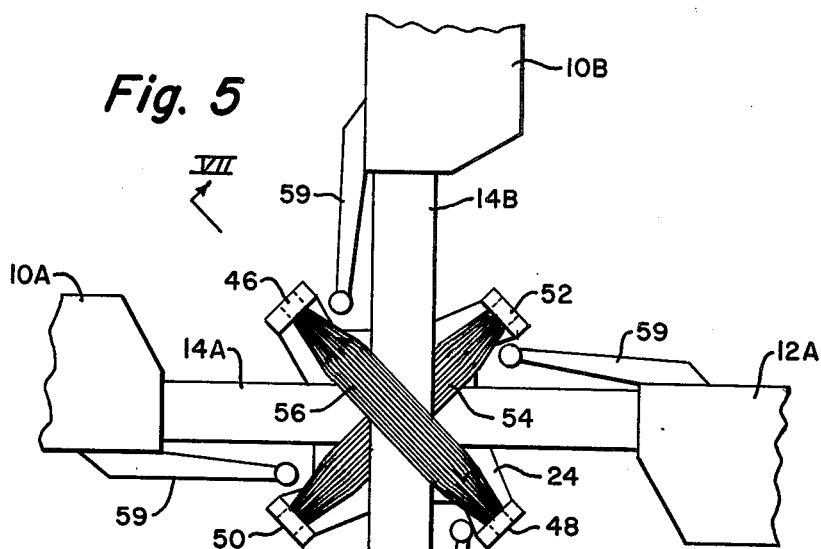
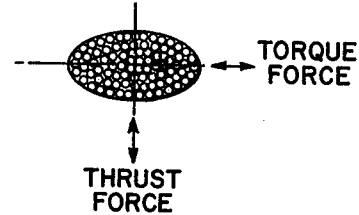
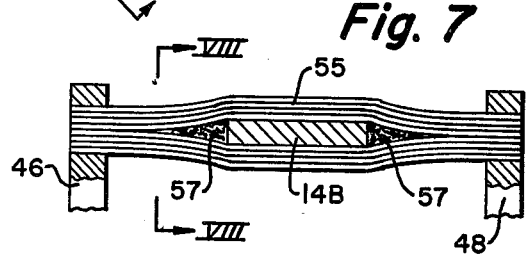
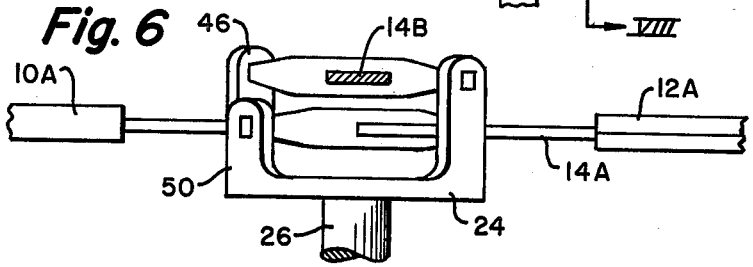
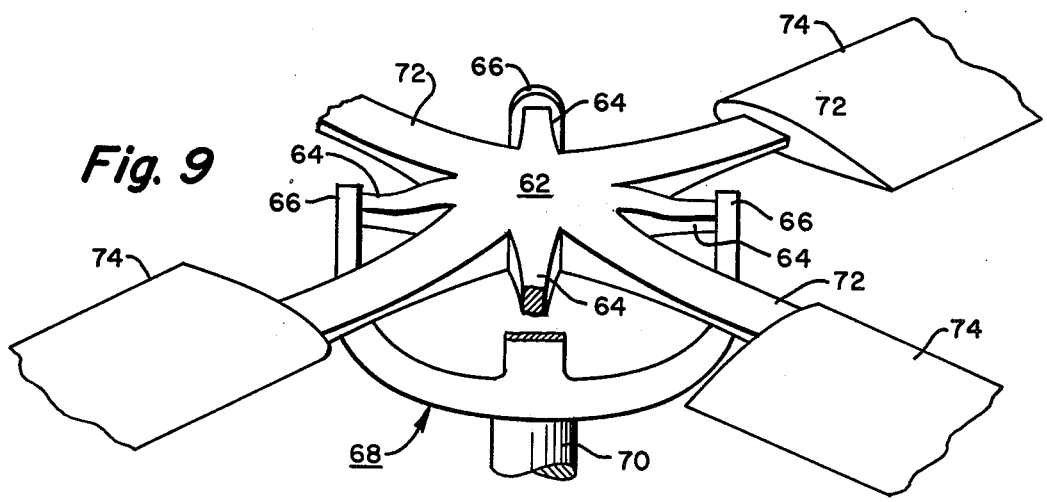

3,880,551

ROTARY HEAD ASSEMBLY FOR ROTARY WING AIRCRAFT

BACKGROUND OF THE INVENTION

In the design of rotor assemblies for rotary wing aircraft, such as helicopters, it is desirable to eliminate pivots or bearings which require costly maintenance and represent potential safety hazards. To eliminate such problems, hingeless blade attachments have been developed. However, in the case of a tail rotor, a hingeless arrangement may cause high hub moments and severe vibration. Teetered, gimbaled or articulated blades are, therefore, preferred. These configurations, however, require pivots or bearings. Bearings can be eliminated by utilizing flexible straps for connecting the blades to the hub such that the strap can bend and twist in response to flap bending and pitch movements respectively. In this case, the strap root can be either clamped or attached pivotally to the hub. Cantilever attachment of this type requires so-called "shoes" for strap bending strain control; and although such arrangements are simple, strap stresses due to flap bending are relatively high and the inherent equivalent flap hinge offset results in substantial hub moments. Additionally, potential fretting and/or foreign object damage may cause additional problems at the "shoe" - blade interface.

SUMMARY OF THE INVENTION

The present invention eliminates dynamic, stress and maintenance problems in a rotary wing aircraft hub assembly by utilizing a torsional flexure which replaces shoes or bearings. In this manner, the rotor becomes in principle a teetering arc with very low hub moments and low flap bending stresses in the strap. By trade-offs between allowable torsional stresses in the torsional flexure and flap-chordwise bending stresses in the strap, an optimum structure can be obtained, complying with dynamic, stress and maintenance requirements.

Specifically, there is provided in accordance with the invention a rotor hub, a pair of blades disposed on opposite sides of the hub, integral flexible strap means interconnecting the blades, and blade mounting means connecting the strap means to the hub intermediate the blades, the mounting means extending substantially transverse to the longitudinal axes of the blades and having a degree of torsional flexibility about an axis substantially transverse to the longitudinal axes of the blades which permits the mounting means and the strap mounted thereon to twist about the aforesaid transverse axis.

The above and other objects and features of the invention will become apparent from the following detailed description taken in connection with the accompanying drawings which form a part of this specification, and in which:

FIGS. 5 and 6 are top and side views, respectively, of a further embodiment of the invention wherein the torsional flexure elements are disposed at an angle other than 90° with respect to the longitudinal axes of the rotor blades;

FIG. 7 is a cross-sectional view along the line VII—VII of FIG. 5;

FIG. 8 is a cross-sectional view along the line VIII—VIII of FIG. 7; and

FIG. 9 illustrates still another embodiment of the invention wherein flexible blade straps are interwoven with associated flexures.

Figure 1:
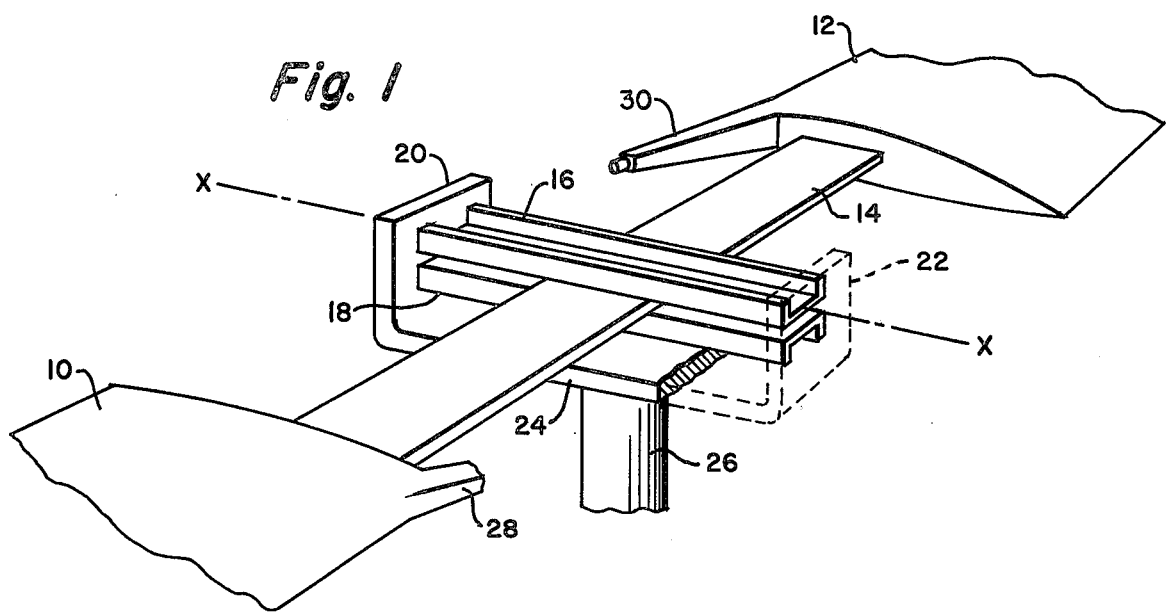
FIG. 1 is a perspective view of one embodiment of the invention employing back-to-back channel members as a flexure.

With reference now to the drawings, and particularly to FIG. 1, the hub portion of a helicopter tail rotor, for example, is shown which incorporates only two oppositely-disposed blades 10 and 12. Interconnecting the two blades 10 and 12 is an integral, flexible strap 14 formed from unidirectional glass fibers embedded or impregnated with a bonding thermosetting resin, such as an epoxy resin. A strap of this type is well known in the art and has a high degree of strength while at the same time having a relatively high degree of flexibility about its longitudinal axis.

The integral strap 14 extends through and is secured to a pair of back-to-back flexure channels 16 and 18 connected at their opposite ends to upstanding lug portions 20 and 22 of a hub 24. The strap can be secured to the channels by bolts or by bonding and curing in the case where both the strap and channels are formed from fiberglass. The hub 24, in turn, is connected to a rotary shaft 26 connected through gearing or the like, not shown, to the power plant for the aircraft. Projecting outwardly from the leading edges of the respective blades 10 and 12 are pitch arms 28 and 30. The pitch arms are connected through pitch links, not shown, to a suitable mechanism for deflecting the blades about their longitudinal axes, thereby effecting pitch motions. In so doing, the strap 14 is caused to twist about its longitudinal axis.

With the arrangement shown in FIG. 1, radial forces on the blades are taken by the integral strap 14. At the same time, the strap permits flapping motions of the blades upwardly and downwardly. The flexure channels 16 and 18 have a degree of flexibility such that, under flapping motions, the two channels 16 and 18 will twist about a mutual flexural axis X—X extending between the lug portions 20 and 22. The channels 16 and 18 can be formed from various materials; however it is preferable to form them from unidirectional fiberglass fibers embedded with an epoxy resin, the unidirectional fibers extending between the lug portions 20 and 22. This will maximize the strength of the flexure channels while at the same time permitting them to twist to accommodate flapping motions of the blades and strap 14.

Figure 2:
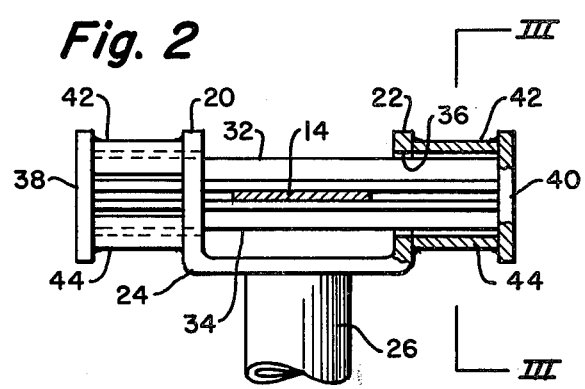
FIG. 2 illustrates another embodiment of the invention similar to that of FIG. 1 but wherein internal and external torsional flexures are combined so as to form two flexures in series.
Figure 3:
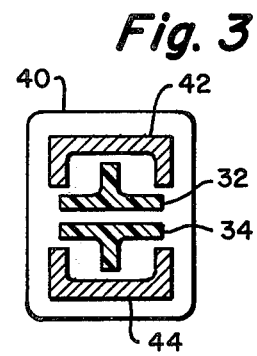
FIG. 3 is a cross-sectional view taken substantially along line III—III of FIG. 2.

In FIG. 2, a modified form of the invention is shown which again includes a hub 24 connected to a shaft 26, the hub 24 having upstanding lug portions 20 and 22. In this case, flexures 32 and 34 on opposite sides of the strap 14 are generally T-shaped in cross section as shown in FIG. 3 and extend through openings 36 in the upstanding lug portions 20 and 22. They are connected, at their ends, to adapter plates 38 and 40. Also connected to the adapter plates 38 and 40 above the flexures 32 and 34 are external flexure channels 42 and 44, these being connected at their inner ends to the lug 20 or 22, respectively. With an arrangement of this sort, it will be appreciated that the effective length of the flexure assembly can be increased without increasing the width of the hub by folding the flexural members over themselves, the adapter plates 38 and 40 serving to transmit torque from flexures 32 and 34 to the flexure channels 42 and 44, respectively. At the same time, the width of the hub assembly is minimized. In the case where four blades are carried on the rotor rather than two as shown in FIG. 1, there will be two sets of upstanding lugs projecting from the hub 24 and two separate flexures extending between the respective sets of lugs one above the other, in a manner similar to FIG. 5 and 6 about to be described.

Figure 4:
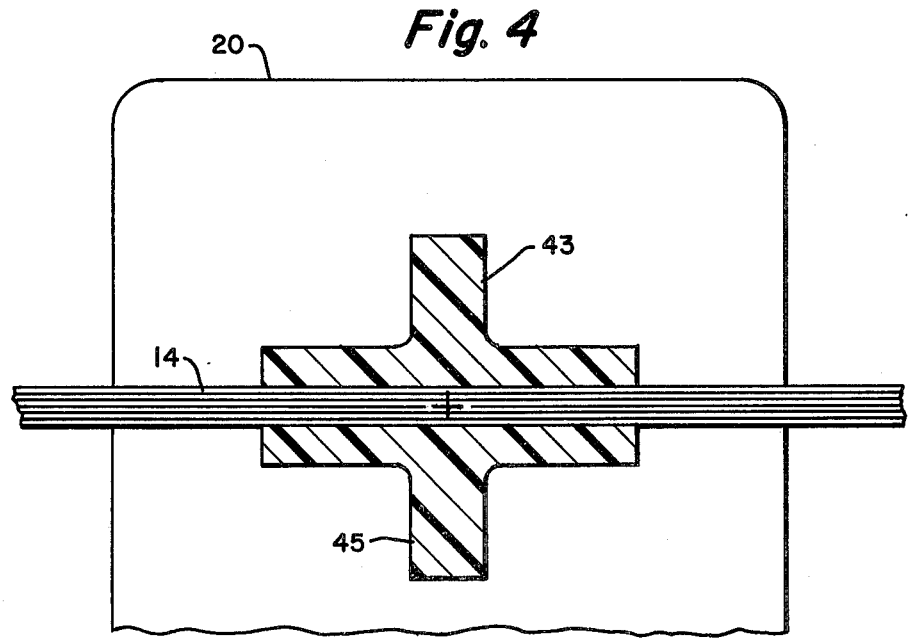
FIG. 4 is a cross-sectional view of another embodiment of the invention wherein the flexure is in the form of a single pair of back-to-back members of T-shaped cross section.

FIG. 4 illustrates, in cross section, a modified form of the embodiment of FIG. 1. In this case, however, back-to-back flexures 43 and 45 of T-shaped cross section extend between lugs 20 and 22 and are secured to the strap 14. Again, the flexures 43 and 45 are formed from fiberglass fibers arranged unidirectionally along the lengths of the flexures and embedded in a suitable epoxy resin so that they can twist about their axes. Whether channels or T-shaped members are used depends upon the torsional strength characteristics required for a particular application.

In FIGS. 5 and 6, another embodiment of the invention is shown which is similar to that of FIG. 1. It includes two sets of blades 10A, 12A and 10B, 12B interconnected by flexible, integral straps 14A and 14B, respectively. As in the embodiment of FIG. 1, a drive shaft 26 is connected to a hub 24. In this case, however, the hub has two sets of upstanding lug portions 46, 48 and 50, 52, the set 46, 48 being higher than the other two lug portions. Extending between the lug portions 46 and 48 is a first torsional flexure 54; and between the lug portions 50 and 52 is a second torsional flexure 56. Each of the flexures 54 and 56 is again formed from unidirectional fiberglass fibers embedded in a suitable epoxy, the fibers extending between their associated lugs.

As shown in FIG. 7, the fiberglass fibers 55 which form the torsional flexures 54 and 56 straddle the straps 14A and 14B, leaving voids 57 which are filled with a resin-glass chips mix. Their cross section, FIG. 8, is substantially elliptical with the axes of the flexures being oriented such as to minimize respective bending stresses due to rotor torque and thrust.

From FIG. 5, it can be seen that the flexures 54 and 56 are disposed at angles of 45° with respect to the longitudinal axes of the blades. The distance between each flexure and the leading edge of an associated blade which carries a pitch arm 59 is thus shorter than the distance between the other side of the strap 14A or 14B and the blade. Therefore, the leading edge of the strap is stiffer and its trailing edge softer, providing the desired delta-3 effect in which as the blade flaps it tends to reduce its pitch angle thus reducing aerodynamic forces enhancing flapping. At the same time, the flexures 54 and 56 can flex under flapping movements of the blades.

In FIG. 9, still another embodiment of the invention is shown which comprises an integral member 62 having four stub shafts or flexures 64 projecting outwardly therefrom and connected to lug sections 66 projecting upwardly from a hub 68 connected to a drive shaft 70. In this case, the straps 72 are formed integrally with the flexures or stub portions 64 which again extend at angles of 45° with respect to the longitudinal axes of the blades 74. The arrangement is essentially the same as that of FIG. 5 with the flexures permitting torsional or twisting movement about their axes due to flapping movement of the blades. The member 62 is again formed from embedded fibers which extend along the axes of the elements 64 and 72 and meet at the central portion of the member. Bending or twisting moments are taken between this central portion and the lugs or blades, as the case may be, thus enabling a gimbaling motion of the blade set. In all embodiments of the invention, the flexural axes of the straps and the mounting means therefor must intersect the axis of the rotor.

The present invention thus provides a rotor hub assembly for helicopters and the like wherein bearings are entirely eliminated while facilitating all of the necessary movements of the blades. Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A Rotor Head Assembly for Rotary Wing Aircraft comprising a rotor hub, a pair of blades disposed on opposite sides of said hub, integral flexible strap means interconnecting said blades, and strap mounting means connecting said strap means to said hub intermediate said blades, said mounting means extending transverse to the longitudinal axis of said blades and having a degree of torsional flexibility about an axis to said longitudinal axis of the blades, said transverse axis intersecting the axis of rotation of said rotor hub which permits the mounting means and the strap mounted thereon to teeter about said transverse axis.

2. The assembly of claim 1 wherein said flexible strap is generally flat, there being a single integral strap interconnecting said blades.

3. The assembly of claim 1 wherein there are two sets of blades and two interconecting flexible strap means for the respective sets of blades, and a mounting means having a degree of torsional flexibility for each of said strap means.

4. The assembly of claim 1 wherein said mounting means is formed from fiberglass fibers embedded in an epoxy resin.

5. The assembly of claim 4 wherein said fiberglass fibers extend unidirectionally and generally parallel to said transverse axis.

6. The assembly of claim 1 wherein said rotor hub comprises a first portion connected to a driving shaft for said rotor head, and diametrically-opposed upstanding portions on said first portion on the side thereof opposite said shaft, said mounting means extending between said upstanding portions.

7. The assembly of claim 1 wherein said mounting means comprises flexures in the form of back-to-back channels.

8. The assembly of claim 1 wherein said mounting means comprises parallel flexures on opposite sides of said strap means, each of said flexures having a generally T-shaped cross-sectional area.

9. The assembly of claim 1 wherein said mounting means extends transverse to the longitudinal axes of said blades at an angle other than 90° with respect to said axes whereby the distance between the leading edge of a blade and said mounting means will be less than that between the mounting means and the trailing edge of the blade.

10. The assembly of claim 6 wherein said mounting means comprises a flexure having ends secured to said diametrically-opposed upstanding portions, the strap means extending through and being straddled by said flexure means.

11. The assembly of claim 10 wherein the ends of the flexure are substantially conical and taper from a minimum cross-sectional area at their connections to the upstanding portions.

12. The assembly of claim 6 wherein said straps and said mounting means are formed from one integral member.

13. The assembly of claim 12 wherein the flexural axes of said straps and said mounting means intersect with the rotor axis.

* * * * *